Dec. 12, 1967     F. J. CANNELL     3,357,071
INDICATOR HOLDING CLAMP
Filed June 9, 1966
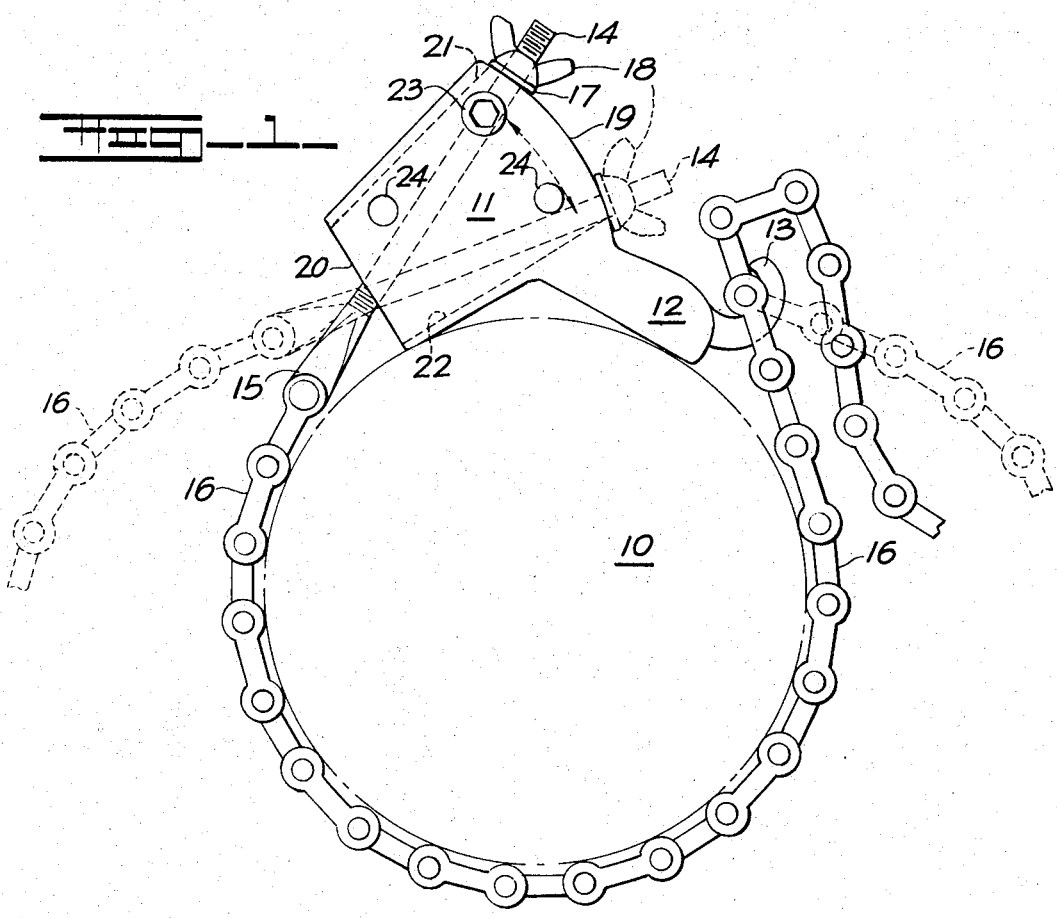
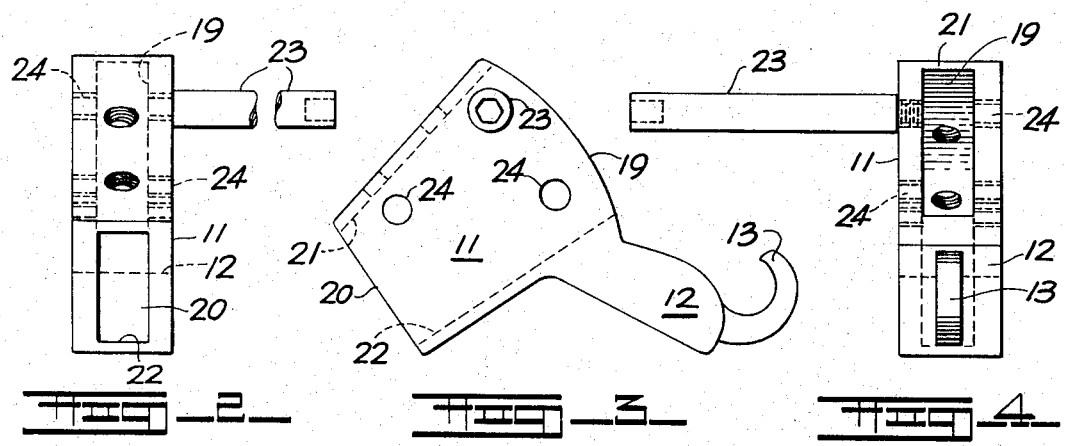
INVENTOR.
Fred J. Cannell
BY
W. B. Harpman
ATTORNEY.

United States Patent Office 3,357,071
Patented Dec. 12, 1967

3,357,071
INDICATOR HOLDING CLAMP
Fred J. Cannell, 2818 Idlewood Ave.,
Youngstown, Ohio 44511
Filed June 9, 1966, Ser. No. 556,318
3 Claims. (Cl. 24—281)

ABSTRACT OF THE DISCLOSURE

An indicator holding clamp including a clamp body having a movable member mounting one end of a clamping chain so that it may be positioned in a most effective location for exerting tension between the body and the chain of the device, which permits the chain to assume its normal configuration as determined by the shape of the article on which the clamp is positioned, and with the movable member in the clamp body arranged to lie on the lines of force exerted in clamping the device to the article.

---

This invention relates to a clamp and more particularly to a clamp of particular use to machinists in mounting indicators on work pieces and the like.

The principal object of the invention is the provision of an indicator mounting clamp which may be mounted on cross sectionally circular shafts or cross sectionally rectangular work pieces to form a secure and film support for an indicator or similar machinist's tool.

A further object of the invention is the provision of an indicator mounting clamp incorporating a clamping chain and means secured to said chain and extending through said clamp and movable to a desired position relative to the line of tension between chain and said clamp.

A still further object of the invention is the provision of a simple and efficient indicator mounting clamp which may be easily assembled and secured on various work pieces and the like so as to provide a firm fixed mounting for an indicator.

Those skilled in the art will recognize that machinists frequently use an indicator to determine the amount of metal removed from a work piece or the like or to facilitate machining the work piece to a particular dimension or shape and that it is accordingly necessary to mount the indicator on the work piece so that the relative measurement can be made. Devices heretofore known in the art have comprised various types of mechanical clamps and in recent years magnetic clamps have been generally used for this purpose. These devices, while practical under many conditions, are not universally adaptable and, for example, most of them are completely incapable of being secured to a shaft or other work piece having a generally circular or oval cross sectional shape or the like. The present invention discloses a clamp which can be effectively secured on a work piece of any cross sectional shape, including shafts and plates or other rectangular body members. The present invention provides a novel clamp body having a movable member mounting one end of a clamping chain so that it may be positioned in a most effective location for exerting tension between the body and the chain of the device which permits the chain to assume its normal configuration as determined by the shape of the article on which the clamp is positioned and more importantly the movable member in the clamp body can be arranged to lie substantially on the lines of force exerted in clamping the device to the work piece.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

This invention is illustrated in the accompanying drawing, wherein:

FIGURE 1 is a side elevation of the indicator mounting clamp in position on a cross sectionally circular work piece, broken lines in FIGURE 1 indicating an alternate positioning on a work piece of a different cross sectional configuration.

FIGURE 2 is an end elevation of the left end of the clamp body as seen in FIGURE 1 of the drawings.

FIGURE 3 is a plan view of the clamp body seen in FIGURE 1 of the drawings and including an indicator mounting shaft positioned thereon.

FIGURE 4 is an end elevation of the right end of the clamp seen in FIGURE 1 of the drawings.

By referring to the drawings in FIGURE 1 in particular, it will be seen that a cross sectionally circular work piece 10 has been disclosed and the indicator mounting clamp is shown in position thereon. The clamp comprises a hollow body member 11 having an extended angularly disposed portion 12 with a hook 13 on its outermost end. An elongated tensioning bolt 14 is positioned through the hollow body member 11 and one end thereof is pivoted as by a pivot pin 15 to one end of a flexible link chain 16. The other end of the flexible link chain is adapted to be engaged on the hook 13. A magnetic washer 17 and a butterfly nut 18 are positioned on the threaded end of the bolt 14 so that the bolt 14 may be moved longitudinally to provide a clamping action on the chain 16 relative to the hollow body member 11.

By referring to FIGURE 4 of the drawings, it will be observed that the hollow body member 11 has a relatively wide right end opening 19 and that the opening 19 extends inwardly through the hollow body member to a relatively smaller left end opening 20. The upper and lower walls of the hollow body member 11 are relatively thin and indicated in the drawings by the numerals 21 and 22, respectively. It will be observed that the opening 20 in the left end of the hollow body member 11 is of a size sufficient to admit a substantial portion of the end of the bolt 14 where it is pivoted by the pivot pin 15 to the end of the flexible link chain 16. It will further be seen that the relatively large width of the opening 19 and the opening 20 in the opposite ends of the hollow body member permits the tensioning bolt 14 to move relative to the hollow body member 11 so that it can and will conform to the particular line of clamping force necessary depending upon the configuration of the article about which the flexible link chain 16 is positioned.

As illustrated in FIGURE 1 of the drawings the tension bolt 14 lies on an extension of the line of force extending from the pivot pin 15 through the tensioning bolt 14 and the magnetic washer 17 and butterfly nut 18 which are engaged directly against the end of the hollow body member 11.

Still referring to FIGURE 1 of the drawings, it will be observed that broken lines indicate an alternate positioning as at such time as the flexible link chain 16 is positioned around a relatively wide article and the tensioning bolt 14 then assumes a different position in the hollow body member 11 and again conforms with the line of tension exerted on the chain 16. The angular arm 12 on the hollow body member provides for a spaced point of contact between the hollow body member and the work piece relative to the corner of the hollow body member immediately adjacent the opening 20 therein and thus enables the device to be positioned on many articles of different cross sectional configuration.

In the several figures of the drawings an indicator mounting post 23 is illustrated as being positioned in a threaded opening in one side of the hollow body member 11 and it will be observed that there are a plurality of threaded openings in the hollow body 11 on the various surfaces thereof so that the indicator post 23 may be moved to whatever position is most convenient for mounting the indicator. Several openings are indicated in the drawings by the numerals 24. It will thus be seen that an indicator mounting clamp has been disclosed which meets the several objects of the invention and having thus described my invention, what I claim is:

1. An indicator holding clamp comprising a hollow body member having elongated openings in its opposite ends, one of said ends being bowed outwardly lengthwise, the elongated opening therein running lengthwise thereof, an arm extending from said hollow body member, a hook on the end of said arm, a section of link chain arranged to be selectively engaged on said hook, a tension bolt pivotally secured to one end of said section of link chain, said tension bolt positioned through said hollow body member and means on said bolt engaging said bowed end of said hollow body member for moving said tensioning bolt relative thereto and a post mounted on said hollow body member and extending perpendicularly with respect thereto for receiving the said indicator.

2. The indicator mounting clamp set forth in claim 1 and wherein said hollow body member has oppositely disposed flat side walls uniformly spaced with respect to one another and wherein the elongated openings in the opposite ends are slot like openings between the ends of said flat side walls.

3. The indicator mounting clamp set forth in claim 1 and wherein said hollow body member is generally rectangular with two of its four walls spaced relatively closer to one another than the other two of said walls, said other two walls being narrower than said first mentioned walls, and wherein the openings in the opposite ends of the hollow body member are elongated and slot like in configuration and wherein said arm is disposed at an angle with respect to one of the narrower of said walls and with said narrower wall forms spaced contact points for engaging a work piece on which the indicator mounting clamp is to be mounted.

References Cited

UNITED STATES PATENTS

| | | | |
|---|---|---|---|
| 1,816,197 | 7/1931 | Ruemelin | 24—281 X |
| 1,915,715 | 6/1933 | Bodendieck | 248—231 |
| 2,968,978 | 1/1961 | Wheeler | 81—66 X |
| 3,118,694 | 1/1964 | Bernard | 287—20 X |

FOREIGN PATENTS

| | | |
|---|---|---|
| 1,017,676 | 9/1952 | France. |
| 132,758 | 9/1919 | Great Britain. |

JAMES L. JONES, JR., *Primary Examiner.*